Patented Nov. 9, 1926.

1,606,595

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

METHOD OF MANUFACTURING A RUBBERIZED FIBER COMPOSITION.

No Drawing. Application filed July 31, 1922, Serial No. 578,819. Renewed January 12, 1926.

My invention relates to a method of making a rubberized fiber composition which may be utilized in a variety of capacities, such as, for floor or wall coverings, as a substitute for leather, or for any other purpose to which a tough, flexible, porous, water-resistant composition may be adapted.

One object of my invention is to provide a new method of displacing the rubber solvent which tends to remain in the rubberized fiber.

Another object of my invention is to provide a new solution for removing the solvent from the rubberized fibers, which reduces the evaporation of the displacing liquid and consequently reduces the cost of the operation.

A further object of my invention consists in providing a novel method of treating an agglomerated mass of rubber coated fibers so as to produce a porous product in which the fibers throughout the entire thickness thereof are uniformly coated with rubber.

It has been suggested to manufacture a rubberized fiber composition by suspending a quantity of separated fibers in a solution comprising rubber dissolved in a mixture of liquids consisting of approximately 77% toluol and 23% ethyl alcohol. After the fibers have been thoroughly dispersed in the solution, the rubber is precipitated thereon. The fibers are then so strained from the solution as to effect a porous matted formation.

The fibers are then passed through the washing or displacing operation. This operation consists of displacing that portion of the solvent which remains in the rubber on the fibers after precipitation, and which will eventually effect depolymerization of the rubber if not properly removed. This operation ordinarily consists of treating the mat of fibers with pure alcohol, which displaces any toluol which may remain in the rubber when it is precipitated. After being treated with the alcohol, the mat is dried and cured in the customary manner. The objection to this method of washing or displacing the rubber solvent is that when pure alcohol is sprayed upon the fibers, the rubber tends to shrink with a rather violent action, which frequently causes the rubber to pull away from the fibers upon which it is deposited, and to form into clots or knots in the mat.

The pure alcohol bath causes the rubber on the fibers disposed in the central portion of the mat to migrate towards the surface thereof, thus causing the rubber coatings on the fibers adjacent the surface of the mat to be materially thicker than those disposed in the central portion thereof. In fact, the rubber may leave the centrally disposed fibers entirely, leaving them uncovered. This is particularly objectionable when the material is made in relatively thick mats and afterwards cut into subdivisions of the proper size.

By my invention I have eliminated the aforementioned objection by treating the rubber coated fibers with a mixture of a rubber precipitant and a rubber solvent of such proportions that any solvent in the rubber is gradually displaced by the precipitant in the washing solution. By reason of the rather diluted precipitant which is employed, shrinkage of the rubber is prevented, thus eliminating any tendency of the rubber to shrink away from the fibers upon which they are deposited.

Also, the difficulties caused by the migration of the rubber are entirely eliminated and the mat is left with uniformly coated fibers throughout its entire thickness. This causes the unions between the coatings of rubber at the points of contact of the fibers to be of uniform strength and provides a porous mat of uniform strength.

In the method heretofore employed, the evaporation of the alcohol during the washing process has been a rather important item owing to the cost of the alcohol. By my invention, the evaporation of the precipitating fluid is materially reduced by being substituted in part by the evaporation of a less expensive solvent.

In practicing my invention fibers are first beaten in any suitable manner, such for example as in a Claflin beater, commonly employed in the paper industry. The fibers are beaten until they are thoroughly separated and dispersed in the liquid employed, which is usually water (see copending applications Serial Numbers 626,899 and 521,908). The fibers are then mixed with the alcohol and toluol either before or after the addition of the rubber cement. The rubber may then be precipitated upon the fibers either by the addition of a precipitating fluid, such, for example, as alcohol, acetone, or the like, or by the reduction of the temperature of the solution. The fibers are then so strained from the liquid as to effect a matted formation. The mat formed is then subjected to the washing or displacing process, which consists in displacing by means of some liquid, usually a rubber precipitant, any solvent which may remain in the rubber. For the washing operation I employ a mixture comprising a relatively large amount of alcohol, and a relatively smaller amount of toluol usually, approximately, 40% toluol and 60% alcohol. After the washing operation, the mat is dried and cured in the customary manner. If desired, the mat may be subjected to the action of vulcanizing agents before being dried, or the rubber may be subjected to treatment by vulcanizing gases while in solution. Again, the product may be made without vulcanizing the rubber. The fact that diluted alcohol is used prevents the sudden and violent shrinkage of the rubber, which occurs when pure alcohol is used. This eliminates the shrinking of the rubber away from the fibers, which is a very undesirable feature of the previously used washing method.

Also, most of the losses which occur in the formation of rubberized fiber compositions occur during the washing operation owing to evaporation. I have found that when a mixture of alcohol and toluol is employed for the washing operation, the total amount of liquid which evaporates is the same as when pure alcohol is employed. However, when the toluol-alcohol solution is used, the toluol will evaporate simultaneously with the alcohol, and since the total amount of evaporation is the same, it is obvious that by my invention I have substituted the evaporation of a certain amount of alcohol by the evaporation of a similar amount of toluol. Since toluol is considerably less expensive than alcohol, it is advisable to make this substitution when possible.

In forming the fiber composition by a continuous method, I prefer to wash the rubber coated fibers successively in several liquids, starting with a wash liquid of but slightly more than 23% alcohol and slightly less than 77% toluol, and finally concluding the washing operation with the 40% toluol 60% alcohol mixture.

One very important advantage obtained by my invention is that a mat of any desired thickness may be made with all the fibers thereof uniformly coated. This is a highly desirable characteristic as the unity and strength of the material, to a considerable extent, depends upon the bond or union formed between the fibers by the adhesion of the rubber thereof at the points of contact of the fibers. The resulting product is a porous fibrous mass the individual fibers of which are welded together at each point where the felted fibers contact with each other.

While I have referred throughout the specification and claims to my invention being employed in connection with the use of toluol and alcohol, it will be obvious that it likewise applies to other liquids of similar properties. Also in using the term fibers, I refer to all of the various fibers which are ordinarily used for purposes of this character, such, for example, as cotton, wool, hemp, jute, asbestos, leather, and the like.

Although I have described in detail but a single application of my invention, it will be obvious to those skilled in the art that various minor changes and modifications may be made therein, without departing from the spirit of my invention or from the scope of the appended claims.

What I claim is:

1. The method of treating fibers which consists in separating them, causing rubber particles to adhere to the fibers, treating said fibers with a liquid comprising a mixture of a rubber precipitant and a rubber solvent, and curing the product.

2. The method of treating fibers which consists in precipitating rubber particles on a quantity of separated fibers, treating said fibers with a liquid comprising a mixture of a rubber precipitant and a rubber solvent, and drying said fibers.

3. The method of treating fibers which consists in causing rubber particles to adhere to the fibers, treating said fibers with a liquid comprising a mixture of toluol and alcohol, drying said fibers, and curing the product.

4. The method of treating fibers which consists in precipitating rubber particles on the fibers, treating the fibers with a mixture of toluol and alcohol, and curing and drying the product.

5. The method of treating fibers which comprises separating them, suspending them in a solution of rubber, toluol and alcohol, precipitating the rubber on the fibers, removing the fibers from the liquid, treating them with a mixture of toluol and alcohol, and drying and curing the product.

6. The method of treating fibers which comprises suspending them in a solution of rubber, toluol and alcohol, precipitating the rubber on the fibers, removing the fibers from the liquid, washing them with a mixture of toluol and alcohol, and drying and curing the product.

7. The method of treating fibers which comprises suspending them in a solution comprising rubber, a relatively large amount of rubber solvent and a relatively smaller amount of rubber precipitant, precipitating the rubber on the fibers, removing the fibers from the liquid, washing them with a mixture comprising a relatively large amount of rubber precipitant and a relatively smaller amount of rubber solvent, and drying and curing the product.

8. The method of treating fibers which comprises separating them, dispersing them in a solution comprising rubber, a relatively large amount of toluol and a relatively smaller amount of alcohol, precipitating the rubber on the fibers, removing the fibers from the liquid, and washing them in a liquid comprising a relatively small amount of toluol and a relatively larger amount of alcohol.

9. The method of treating fibers which comprises suspending them in a solution of rubber in a mixture of approximately 77% toluol and 23% alcohol, precipitating the rubber on the fibers, removing the fibers from the solution, treating them with a mixture of less than 77% toluol and more than 23% alcohol, and drying the product.

10. The method of treating fibers which comprises suspending them in a solution comprising rubber and a mixture of approximately 77% toluol and 23% alcohol, precipitating the rubber on the fibers, removing the fibers from the solution, treating them with a mixture of approximately 40% toluol and 60% alcohol, and curing the product.

11. The method of making a fibrous material which comprises uniformly distributing a quantity of separated fibers in a rubber solution comprising approximately 77% toluol and 23% alcohol, precipitating the rubber on the fibers, so straining the fibers from the solution as to effect a matted formation, washing the mat in a mixture comprising approximately 40% toluol and 60% alcohol, and drying the mat.

12. The method of making a fibrous material which comprises suspending a quantity of fibers in a rubber solution comprising approximately 77% toluol and 23% alcohol, precipitating the rubber on the fibers, so straining the fibers from the solution as to effect a matted formation, displacing the liquid in the fibers with a mixture comprising approximately 40% toluol and 60% alcohol, and drying and curing the mat.

13. The method of washing rubber coated fibers free of a rubber solvent which consists in washing them successively in a plurality of liquids, containing a rubber precipitating agent each of which is higher in precipitating agent content than is the preceding wash liquid.

14. The method of displacing a rubber solvent from a mixture of rubber and a rubber solvent which consists of subjecting the rubber to successive treatments by a plurality of liquids containing a rubber precipitating agent, the liquids being of successively greater precipitating agent content.

15. The method of displacing a rubber solvent from rubber which consists of subjecting the rubber to successive treatments by a plurality of liquid mixture, the first liquid mixture comprising slightly more than 23% precipitating agent and the last liquid mixture comprising approximately 60% precipitating agent.

16. The method of displacing a rubber solvent from a rubber containing a rubber solvent which consists of subjecting the rubber to successive treatments by a plurality of liquid mixtures, the first liquid mixture comprising slightly more than 23% alcohol and the last liquid mixture comprising approximately 60% alcohol, the intermediate wash liquids each having an alcoholic content between 23% and 60%.

In witness whereof, I have hereunto signed my name.

WILLIAM G. O'BRIEN.